United States Patent
Suzuki et al.

(10) Patent No.: US 12,489,179 B2
(45) Date of Patent: Dec. 2, 2025

(54) TERMINAL COMPONENT, SECONDARY BATTERY, AND BATTERY PACK

(71) Applicant: PRIME PLANET ENERGY & SOLUTIONS, INC., Tokyo (JP)

(72) Inventors: Kosuke Suzuki, Toyota (JP); Takahiro Sakurai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 601 days.

(21) Appl. No.: 17/567,199

(22) Filed: Jan. 3, 2022

(65) Prior Publication Data

US 2022/0231388 A1 Jul. 21, 2022

(30) Foreign Application Priority Data

Jan. 21, 2021 (JP) ................... 2021-008264

(51) Int. Cl.
*H01M 50/562* (2021.01)
*H01M 50/505* (2021.01)
*H01M 50/566* (2021.01)

(52) U.S. Cl.
CPC ....... *H01M 50/562* (2021.01); *H01M 50/505* (2021.01); *H01M 50/566* (2021.01)

(58) Field of Classification Search
CPC ............. H01M 50/562; H01M 50/505; H01M 50/566; B23K 20/10; B23K 2101/38
See application file for complete search history.

(56) References Cited

U.S. PATENT DOCUMENTS

| 2011/0159353 A1 | 6/2011 | Byun et al. |
| 2013/0344378 A1 | 12/2013 | Kohara et al. |
| 2014/0011074 A1 | 1/2014 | Oda et al. |
| 2016/0329542 A1 | 11/2016 | Tyler et al. |
| 2017/0162853 A1 | 6/2017 | Guen |
| 2017/0170445 A1 | 6/2017 | Kim et al. |
| 2019/0337078 A1 | 11/2019 | Masaki et al. |

FOREIGN PATENT DOCUMENTS

| EP | 4 131 633 A2 | 2/2023 |
| JP | H1133737 A | * 7/1997 |
| JP | 11-033737 A | 2/1999 |
| JP | 2004-227954 A | 8/2004 |
| JP | 2007-196255 A | 8/2007 |
| JP | 2011-124024 A | 6/2011 |
| JP | 2014-136244 A | 7/2014 |
| JP | 2015-225755 A | 12/2015 |

(Continued)

OTHER PUBLICATIONS

Machine translation of KR20170065890A (Year: 2024).*
Machine translation of JPH1133737A (Year: 2024).*

*Primary Examiner* — Milton I Cano
*Assistant Examiner* — Albert Michael Hilton
(74) *Attorney, Agent, or Firm* — Finnegan, Henderson, Farabow, Garrett, and Dunner, LLP

(57) ABSTRACT

A terminal component includes a first metal and a second metal overlapped on the first metal. At a boundary between the first metal and the second metal, there is a joint portion in which the first metal and the second metal are joined by metal joining. The second metal has a groove on the outside of the joint portion on the surface opposite to the surface overlapped on the first metal.

8 Claims, 4 Drawing Sheets

(56) References Cited

FOREIGN PATENT DOCUMENTS

| JP | 2016-018675 A | | 2/2016 |
|----|---------------|---|--------|
| JP | 2016-049547 A | | 4/2016 |
| JP | 2017-139162 A | | 8/2017 |
| JP | 2018-092743 A | | 6/2018 |
| JP | 2018-118261 A | | 8/2018 |
| JP | 2019-040668 A | | 3/2019 |
| KR | 20170065890 A | * | 12/2015 |
| WO | WO 2012/120774 A1 | | 9/2012 |
| WO | WO 2012/169055 A1 | | 12/2012 |

* cited by examiner

TERMINAL COMPONENT, SECONDARY BATTERY, AND BATTERY PACK

BACKGROUND OF THE INVENTION

1. Field of the Invention

The present disclosure relates to a terminal component, a secondary battery, and a battery pack. The present application claims priority based on Japanese Patent Application No. 2021-008264 filed on Jan. 21, 2021, and the entire contents of the application are incorporated herein by reference.

2. Description of the Related Art

Japanese Patent Application Publication No. 2016-18675 discloses a secondary battery provided with external terminals of a positive electrode and a negative electrode that are composed of different materials. Such secondary batteries are connected in series by a bus bar made of the same material as that of one external terminal of the external terminals of the positive electrode and the negative electrode. A metal member composed of a material having excellent weldability to the material of the one external terminal is ultrasonically joined to the other external terminal.

Japanese Patent Application Publication No. 2011-124024 discloses a battery pack in which a plurality of cells is connected by a bus bar. Of the positive electrode terminal and the negative electrode terminal constituting the cell, the terminal having one polarity includes an external terminal having better welding quality with the bus bar and a base to which a foil having the one polarity is connected. The base and the external terminal are joined by ultrasonic joining.

SUMMARY OF THE INVENTION

When dissimilar metals are joined by ultrasonic joining, a horn is pressed against one metal and an ultrasonic vibration is applied while pressurizing to join the one metal to the other metal. At this time, for example, the metal to which the horn is applied may be deformed so that the edge portion of the metal protrudes or so that a part thereof is curved.

Such deformation can occur when performing ultrasonic joining to join dissimilar metals with respect to a terminal to be used in a battery. According to the findings of the present inventor, when such deformation occurs in a terminal to be used in a battery, the deformed portion may penetrate a member such as a gasket that insulates the terminal and a lid and may interfere with other members. Further, where the deformed portion is detached during the manufacturing process, the detached portion may enter the inside of the battery case and cause an internal short circuit. Where a portion of the terminal that becomes a bus bar connection surface is deformed, a gap may appear between the bus bar and the bus bar connection surface, which may cause welding defects.

The terminal component disclosed herein includes a first metal and a second metal overlapped on the first metal. At a boundary between the first metal and the second metal, there is a joint portion in which the first metal and the second metal are joined by metal joining. The second metal has a groove on the outside of the joint portion on the surface opposite to the surface overlapping on the first metal.

The second metal constituting the terminal component has a groove around the joint portion on the surface opposite to the joint portion. By forming such a groove, deformation of the terminal component due to ultrasonic joining can be suppressed.

The groove of the terminal component may be continuous in the circumferential direction. The first metal and the second metal may be composed of dissimilar metals.

A secondary battery provided with a battery case and an electrode terminal attached to the battery case may include a part configured of the terminal component described above.

In a battery pack including a plurality of secondary batteries having external terminals of positive electrodes and negative electrodes and a bus bar that connects the plurality of secondary batteries via the external terminals, at a boundary between an external terminal of one polarity, among the external terminals, and the bus bar, there may be a joint portion in which the external terminal of the one polarity and the bus bar are joined by metal joining, and the bus bar may have a groove on the outside of the joint portion on the surface opposite to the joint portion.

DESCRIPTION OF THE PREFERRED EMBODIMENTS

Figure 1:
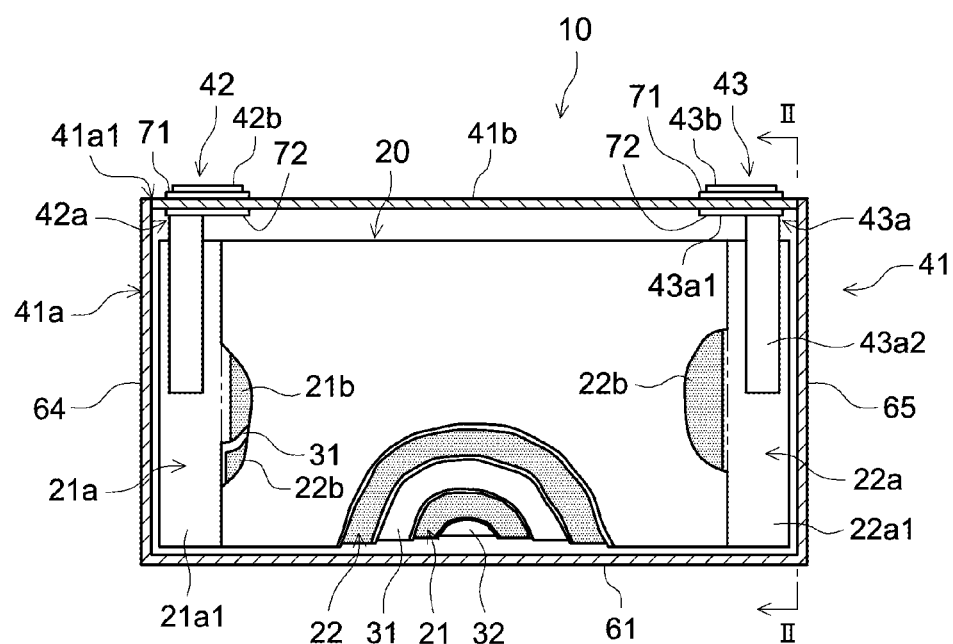
FIG. 1 is a partial cross-sectional view of a lithium ion secondary battery 10.

Hereinafter, embodiments of the terminal component and the secondary battery disclosed herein will be described. The embodiments described herein are, of course, not intended to specifically limit the present disclosure. The present disclosure is not limited to the embodiments described herein, unless otherwise specified. Each drawing is schematically drawn and does not necessarily reflect the actual configuration. In addition, members and parts that perform the same action are designated, as appropriate, by the same reference numerals, and duplicate description thereof will be omitted.

Secondary Battery

In the present description, the "secondary battery" means a device capable of charging and discharging. The secondary battery is inclusive of a battery generally called a lithium ion battery, a lithium secondary battery, or the like, a lithium polymer battery, a lithium ion capacitor, or the like. Here, a lithium ion secondary battery will be illustrated as a form of the secondary battery.

Lithium-Ion Secondary Battery 10

Figure 2:
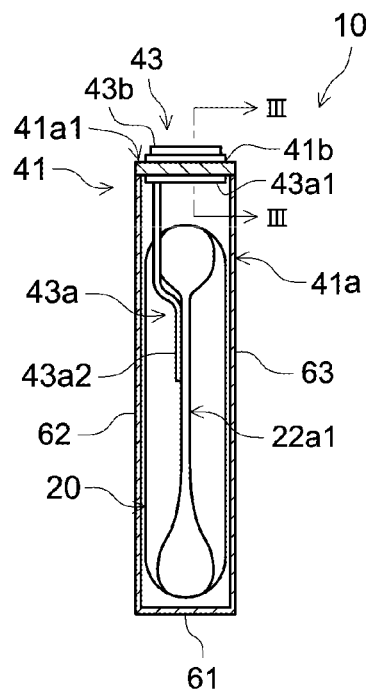
FIG. 2 is a cross-sectional view showing a II-II cross section of FIG. 1.

FIG. 1 is a partial cross-sectional view of a lithium ion secondary battery 10. In FIG. 1, a state in which the inside is exposed is drawn along a wide surface on one side of a substantially rectangular parallelepiped battery case 41. The lithium ion secondary battery 10 shown in FIG. 1 is a so-called sealed battery. FIG. 2 is a cross-sectional view showing a II-II cross section of FIG. 1. In FIG. 2, a partial cross-sectional view of a substantially rectangular parallelepiped battery case 41 in a state where the inside is exposed along a narrow surface on one side is schematically drawn.

As shown in FIG. 1, the lithium ion secondary battery 10 includes an electrode body 20, a battery case 41, a positive electrode terminal 42, and a negative electrode terminal 43.

Electrode Body 20

The electrode body 20 is accommodated in the battery case 41 in a state of being covered with an insulating film (not shown) or the like. The electrode body 20 includes a positive electrode sheet 21 as a positive electrode element, a negative electrode sheet 22 as a negative electrode element, and separator sheets 31 and 32 as separators. The positive electrode sheet 21, the first separator sheet 31, the negative electrode sheet 22, and the second separator sheet 32 are long strip-shaped members, respectively.

In the positive electrode sheet 21, a positive electrode active material layer 21b including a positive electrode active material is formed on both sides of a positive electrode current collecting foil 21a (for example, an aluminum foil) having a predetermined width and thickness, except for a non-formation portion 21a1 that is set to a constant width at one end in the width direction. For example, in a lithium ion secondary battery, the positive electrode active material is a material capable of releasing lithium ions during charging and absorbing lithium ions during discharging, such as a lithium transition metal composite material. Various positive electrode active materials have been generally proposed in addition to the lithium transition metal composite material, and the type of the positive electrode active material is not particularly limited.

In the negative electrode sheet 22, a negative electrode active material layer 22b including a negative electrode active material is formed on both sides of a negative electrode current collecting foil 22a (here, a copper foil) having a predetermined width and thickness, except for a non-formation portion 22a1 that is set to a constant width at one end in the width direction. For example, in a lithium ion secondary battery, the negative electrode active material is a material capable of occluding lithium ions during charging and releasing the occluded lithium ions during discharging, such as natural graphite. Various negative electrode active materials have been generally proposed in addition to natural graphite, and the type of the negative electrode active material is not particularly limited.

For the separator sheets 31 and 32, for example, a porous resin sheet which has a required heat resistance and through which an electrolyte can pass is used. Various separator sheets have been proposed for the separator sheets 31 and 32, and the type thereof is not particularly limited.

Here, the negative electrode active material layer 22b is formed, for example, to be wider than the positive electrode active material layer 21b. The width of the separator sheets 31 and 32 is larger than that of the negative electrode active material layer 22b. The non-formation portion 21a1 of the positive electrode current collecting foil 21a and the non-formation portion 22a1 of the negative electrode current collecting foil 22a are directed to opposite sides in the width direction. Further, the positive electrode sheet 21, the first separator sheet 31, the negative electrode sheet 22, and the second separator sheet 32 are oriented in the length direction, stacked in this order and wound. The negative electrode active material layer 22b covers the positive electrode active material layer 21b with the separator sheets 31 and 32 interposed therebetween. The negative electrode active material layer 22b is covered with separator sheets 31 and 32. The non-formation portion 21a1 of the positive electrode current collecting foil 21a protrudes from one side of the separator sheets 31 and 32 in the width direction. The non-formation portion 22a1 of the negative electrode current collecting foil 22a protrudes from the separator sheets 31 and 32 on the opposite side in the width direction.

As shown in FIG. 1, the above-described electrode body 20 is flattened along one plane including the winding axis so as to be accommodated in the case body 41a of the battery case 41. The non-formation portion 21a1 of the positive electrode current collecting foil 21a is arranged on one side, and the non-formation portion 22a1 of the negative electrode current collecting foil 22a is arranged on the opposite side along the winding axis of the electrode body 20.

Battery Case 41

As shown in FIG. 1, the electrode body 20 is accommodated in the battery case 41. The battery case 41 has a case body 41a having a substantially rectangular parallelepiped angular shape with one side open, and a lid 41b mounted on the opening. In this embodiment, the case body 41a and the lid 41b are formed of aluminum or an aluminum alloy mainly composed of aluminum, from the viewpoint of weight reduction and ensuring the required rigidity.

Case Body 41a

As shown in FIGS. 1 and 2, the case body 41a has a substantially rectangular parallelepiped angular shape with one side open. The case body 41a has a substantially rectangular bottom surface portion 61, a pair of wide surface portions 62 and 63, and a pair of narrow surface portions 64 and 65. Each of the pair of wide surface portions 62 and 63 rises from the long side of the bottom surface portion 61. Each of the pair of narrow surface portions 64 and 65 rises from the short side of the bottom surface portion 61. An opening 41a1 surrounded by a pair of wide surface portions 62 and 63 and a pair of narrow surface portions 64 and 65 is formed on one side surface of the case body 41a.

Lid 41b

The lid 41b is mounted on the opening 41a1 of the case body 41a surrounded by the long sides of the pair of wide surface portions 62 and 63 and the short sides of the pair of narrow surface portions 64 and 65. The peripheral edge of the lid 41b is joined to the edge of the opening 41a1 of the case body 41a. Such joining may be performed by, for example, continuous welding with no gaps. Such welding can be achieved, for example, by laser welding.

In this embodiment, a positive electrode terminal 42 and a negative electrode terminal 43 are attached to the lid 41b. The positive electrode terminal 42 includes an internal terminal 42a and an external terminal 42b. The negative electrode terminal 43 includes an internal terminal 43a and an external terminal 43b. The internal terminals 42a and 43a are attached to the inside of the lid 41b with an insulator 72 interposed therebetween. The external terminals 42b and 43b are attached to the outside of the lid 41b with a gasket 71 interposed therebetween. The internal terminals 42a and 43a extend inside the case body 41a. The internal terminal 42a of the positive electrode is connected to the non-formation portion 21a1 of the positive electrode current collecting foil 21a. The internal terminal 43a of the negative electrode is connected to the non-formation portion 22a1 of the negative electrode current collecting foil 22a.

As shown in FIG. 1, the non-formation portion 21a1 of the positive electrode current collecting foil 21a of the electrode body 20 and the non-formation portion 22a1 of the negative electrode current collecting foil 22a are attached to the internal terminals 42a and 43a that are attached to both sides of the lid 41*b* in the longitudinal direction. The electrode body 20 is accommodated in the battery case 41 in a state of being attached to the internal terminals 42*a* and 43*a* attached to the lid 41*b*. Here, the wound electrode body 20 is illustrated by way of example. The structure of the electrode body 20 is not limited to such a form. The structure of the electrode body 20 may be, for example, a laminated structure in which a positive electrode sheet and a negative electrode sheet are alternately laminated with a separator sheet interposed therebetween. Further, a plurality of electrode bodies 20 may be accommodated in the battery case 41.

Figure 3:
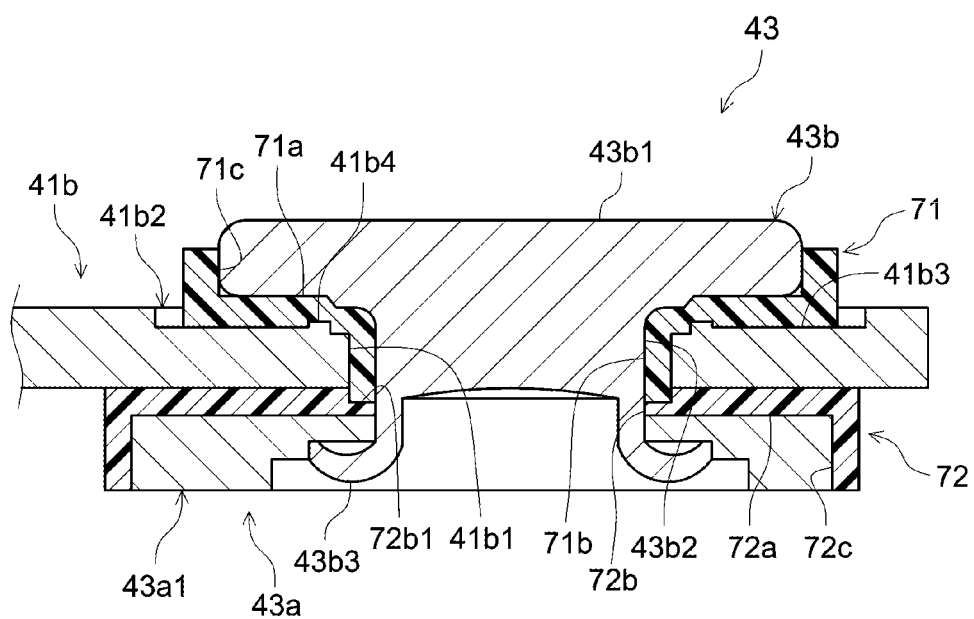
FIG. 3 is a sectional view taken along line of FIG. 2.

FIG. 3 is a sectional view taken along line of FIG. 2. FIG. 3 shows a cross section of a part where the negative electrode terminal 43 is attached to the lid 41*b*. In this embodiment, a member in which dissimilar metals are joined is used for the external terminal 43*b* of the negative electrode. In FIG. 3, the structure such as the groove in the metal constituting the external terminal 43*b*, the interface between dissimilar metals, and the like are not shown, and the cross-sectional shape of the external terminal 43*b* is schematically shown.

As shown in FIG. 3, the lid 41*b* has an attachment hole 41*b*1 for attaching the external terminal 43*b* of the negative electrode. The attachment hole 41*b*1 penetrates the lid 41*b* at a predetermined position of the lid 41*b*. The internal terminal 43*a* and the external terminal 43*b* of the negative electrode are attached to the attachment hole 41*b*1 of the lid 41*b* with the gasket 71 and the insulator 72 interposed therebetween. On the outside of the attachment hole 41*b*1, a step 41*b*2 on which the gasket 71 is mounted is provided around the attachment hole 41*b*1. The step 41*b*2 is provided with a seat surface 41*b*3 on which the gasket 71 is arranged. The seat surface 41*b*3 is provided with a projection 41*b*4 for positioning the gasket 71.

Here, as shown in FIG. 3, the external terminal 43*b* of the negative electrode includes a head 43*b*1, a shaft 43*b*2, and a caulking piece 43*b*3. The head 43*b*1 is a part arranged outside the lid 41*b*. The head 43*b*1 is a part that is larger than the attachment hole 41*b*1 and is arranged at the gasket 71. The shaft 43*b*2 is a part mounted in the attachment hole 41*b*1 with the gasket 71 interposed therebetween. The shaft 43*b*2 protrudes downward from a substantially central portion of the head 43*b*1. As shown in FIG. 3, the caulking piece 43*b*3 is a part caulked to the internal terminal 43*a* of the negative electrode inside the lid 41*b*. The caulking piece 43*b*3 extends from the shaft 43*b*2 and is bent and caulked to the internal terminal 43*a* of the negative electrode after being inserted into the lid 41*b*.

Gasket 71

As shown in FIG. 3, the gasket 71 is a member attached to the attachment hole 41*b*1 and the seat surface 41*b*3 of the lid 41*b*. In this embodiment, the gasket 71 includes a seat 71*a*, a boss 71*b*, and a side wall 71*c*. The seat 71*a* is a part mounted on the seat surface 41*b*3 provided on the outer surface around the attachment hole 41*b*1 of the lid 41*b*. The seat 71*a* has a substantially flat surface corresponding to the seat surface 41*b*3. The seat 71*a* is provided with a depression corresponding to the projection 41*b*4 of the seat surface 41*b*3. The boss 71*b* projects from the bottom surface of the seat 71*a*. The boss 71*b* has an outer shape along the inner side surface of the attachment hole 41*b*1 so as to be mounted on the attachment hole 41*b*1 of the lid 41*b*. The inner surface of the boss 71*b* serves as a mounting hole for mounting the shaft 43*b*2 of the external terminal 43*b*. The side wall 71*c* rises upward from the peripheral edge of the seat 71*a*. The head 43*b*1 of the external terminal 43*b* is mounted on a part surrounded by the side wall 71*c* of the gasket 71.

The gasket 71 is arranged between the lid 41*b* and the external terminal 43*b* to ensure insulation between the lid 41*b* and the external terminal 43*b*. Further, the gasket 71 ensures the airtightness of the attachment hole 41*b*1 of the lid 41*b*. From this point of view, it is preferable to use a material having excellent chemical resistance and weather resistance. In this embodiment, PFA is used for the gasket 71. PFA is a copolymer of tetrafluoroethylene and perfluoroalkoxyethylene (Tetrafluoroethylene Perfluoroalkylvinylether Copolymer). The material used for the gasket 71 is not limited to PFA.

Insulator 72

The insulator 72 is a member mounted inside the lid 41*b* around the attachment hole 41*b*1 of the lid 41*b*. The insulator 72 includes a base 72*a*, a hole 72*b*, and a side wall 72*c*. The base 72*a* is a part arranged along the inner surface of the lid 41*b*. In this embodiment, the base 72*a* is a substantially flat plate-shaped part. The base 72*a* is arranged along the inner side surface of the lid 41*b*, and has a size such that the base does not protrude from the lid 41*b* so that it can be housed in the case body 41*a*. The hole 72*b* is provided correspondingly to the attachment hole 41*b*1. In this embodiment, the hole 72*b* is provided in a substantially central portion of the base 72*a*. On the side surface of the lid 41*b* facing the inner side surface, a recessed step 72*b*1 is provided around the hole 72*b*. The step 72*b*1 accommodates the distal end of the boss 71*b* of the gasket 71 mounted in the attachment hole 41*b*1. The side wall 72*c* rises downward from the peripheral edge of the base 72*a*. A proximal portion 43*a*1 provided at one end of the internal terminal 43*a* of the negative electrode is accommodated in the base 72*a*. Since the insulator 72 is arranged inside the battery case 41, it is preferable that the insulator 72 has a required chemical resistance. In this embodiment, PPS is used for the insulator 72. PPS is a polyphenylene sulfide resin. The material used for the insulator 72 is not limited to PPS.

The internal terminal 43*a* of the negative electrode includes the proximal portion 43*a*1 and a connection piece 43*a*2 (see FIGS. 1 and 2). The proximal portion 43*a*1 is a part mounted on the base 72*a* of the insulator 72, In this embodiment, the proximal portion 43*a*1 has a shape corresponding to the inside of the side wall 72*c* around the base 72*a* of the insulator 72. As shown in FIGS. 1 and 2, the connection piece 43*a*2 extends from one end of the proximal portion 43*a*1 and extends into the case body 41*a* to be connected to the non-formation portion 22*a*1 of the negative electrode of the electrode body 20.

In this embodiment, the gasket 71 is attached to the outside of the lid 41*b* while the boss 71*b* is being mounted on the attachment hole 41*b*1. The external terminal 43*b* is mounted on the gasket 71. At this time, the shaft 43*b*2 of the external terminal 43*b* is inserted into the boss 71*b* of the gasket 71, and the head 43*b*1 of the external terminal 43*b* is arranged on the seat 71*a* of the gasket 71. The insulator 72 and the internal terminal 43*a* are attached to the inside of the lid 41*b*. As shown in FIG. 3, the caulking piece 43*b*3 of the external terminal 43*b* is bent and caulked to the proximal portion 43*a*1 of the internal terminal 43*a*. The caulking piece 43*b*3 of the external terminal 43*b* and the proximal portion 43*a*1 of the negative electrode terminal 43 may be partially metal joined in order to improve conductivity.

For the internal terminal 42*a* of the positive electrode of the lithium ion secondary battery 10, the required level of oxidation-reduction resistance is not higher than that of the negative electrode. From the viewpoint of required oxidation-reduction resistance and weight reduction, aluminum can be used for the internal terminal 42a of the positive electrode. By contrast, for the internal terminal 43a of the negative electrode, the required level of oxidation-reduction resistance is higher than that of the positive electrode. From this point of view, copper may be used for the internal terminal 43a of the negative electrode. Meanwhile, as the bus bar to which the external terminal 43b is connected, aluminum or an aluminum alloy may be used from the viewpoint of weight reduction and cost reduction.

The present inventor considered the use of copper or a copper alloy for the part of the external terminal 43b that is to be joined to the internal terminal 43a, and the use of aluminum or an aluminum alloy for the part of the external terminal 43b that is to be connected to the bus bar. In order to realize such a structure, in this embodiment, a member obtained by joining copper and aluminum by dissimilar metal joining is used as the external terminal 43b. Hereinafter, the structure of the terminal component 200 used as the external terminal 43b will be described.

Terminal Component 200

Figure 4:
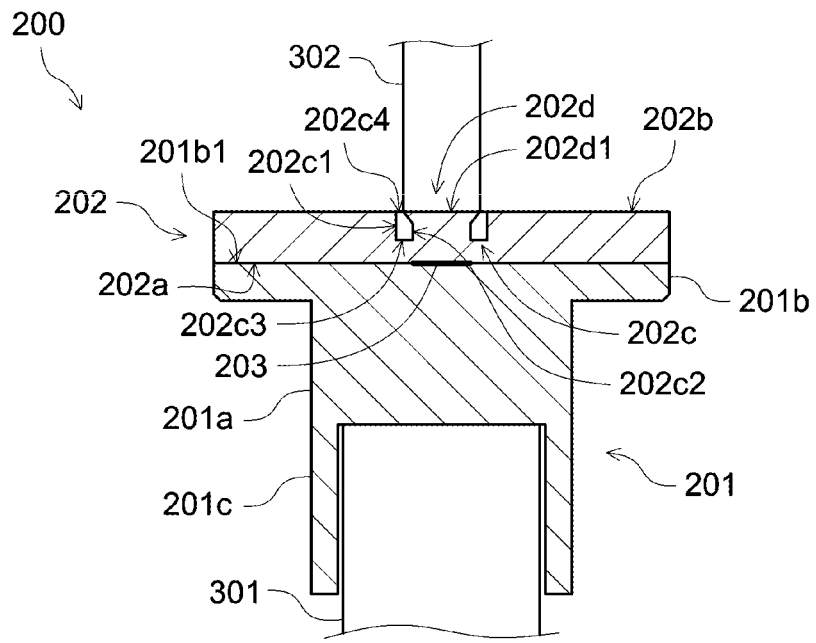
FIG. 4 is a cross-sectional view schematically showing a terminal component 200.

FIG. 4 is a cross-sectional view schematically showing the terminal component 200. FIG. 4 schematically shows a step of joining the first metal 201 and the second metal 202 constituting the terminal component 200. As shown in FIG. 3, the terminal component 200 as the external terminal 43b is attached to the battery case 41 so that a part of the terminal component 200 is connected to the internal terminal 43a inside the battery case 41 and a part of the terminal component is exposed to the outside of the battery case 41.

As shown in FIG. 4, the terminal component 200 includes a first metal 201 and a second metal 202 overlapped on the first metal 201. The first metal 201 and the second metal 202 are configured of different metals.

The first metal 201 is a part that is connected by a portion thereof to the internal terminal 43a inside the battery case 41 when the terminal component 200 is used as the external terminal 43b (see FIG. 3). In this embodiment, the first metal is configured of copper. The first metal 201 has a shaft 201a and a flange 201b. The shaft 201a is a part serving as the shaft 43b2 to be inserted into the attachment hole 41b1 of the lid 41b. The flange 201b is a flat plate-shaped part provided at one end of the shaft 201a and wider than the shaft 201a. The shaft 201a is provided with a part 201c that serves as a caulking piece 43b3 that is further caulked to the internal terminal 43a on the side opposite to the side on which the flange 201b is provided.

The second metal 202 is a part exposed to the outside of the battery case 41 when the terminal component 200 is used as the external terminal 43b (see FIG. 3). As the second metal 202, a metal having malleability and lower rigidity than the first metal 201 is used. In this embodiment, the second metal is configured of aluminum. The second metal 202 is a flat plate-shaped metal member overlapped on the first metal 201. A surface 202a of the second metal 202 overlapped on the first metal 201 has a substantially rectangular shape corresponding to the end surface 201b1 of the first metal 201.

The terminal component 200 has a joint portion 203 in which the first metal 201 and the second metal 202 are joined by metal joining at the boundary between the first metal 201 and the second metal 202. In the joint portion 203, the first metal 201 and the second metal 202 are solid-phase joined without an adhesive layer such as an adhesive or a solder. Such a joint portion 203 can be formed by joining the first metal 201 and the second metal 202 by a method such as ultrasonic pressure welding, friction welding, resistance welding, or the like.

The second metal 202 has a groove 202c on the outside of the joint portion 203 on the surface 202b opposite to the surface 202a overlapped on the first metal 201. The groove 202c is formed on the outside of the portion where the joint portion 203 is projected perpendicularly to the surface 202b. The joint portion 203 and the groove 202c may partially overlap each other. Further, the joint portion 203 may be partially outside the groove 202c. When the groove 202c is continuously formed outside the joint portion 203, the area inside the groove 202c may be larger than the area where the joint portion 203 is projected perpendicularly to the surface 202b.

In this embodiment, the groove 202c is formed in a circumferential shape and is continuous in the circumferential direction. In this embodiment, an outer wall 202c1 of the groove 202c is perpendicular to the surface 202b. An inner wall 202c2 of the groove 202c is perpendicular to the surface 202b near the boundary with a bottom portion 202c3, but is inclined so as to approach the outer wall 202c1 as the distance from the bottom portion 202c3 increases. That is, an inner part 202d on the inside of the groove 202c expands toward a top portion 202d1. Therefore, the area of the bottom portion 202c3 of the groove 202c is larger than the area of an opening 202c4. The shape of the groove 202c is not particularly limited. The groove 202c may be formed in a polygonal shape such as a quadrangle. The groove 202c may not be formed continuously and may be formed intermittently. Further, the opening 202c4 of the groove 202c may be partially or wholly closed by the widening of the top portion 202d1 of the inner part 202d.

In the embodiment shown in FIG. 4, the surface 202b of the second metal 202 and the top portion 202d1 of the inner part 202d are in the same plane. However, such a form is not limiting. The top portion 202d1 may protrude from the surface 202b. Further, the top portion 202d1 may be pushed in more than the surface 202b.

Figure 5:
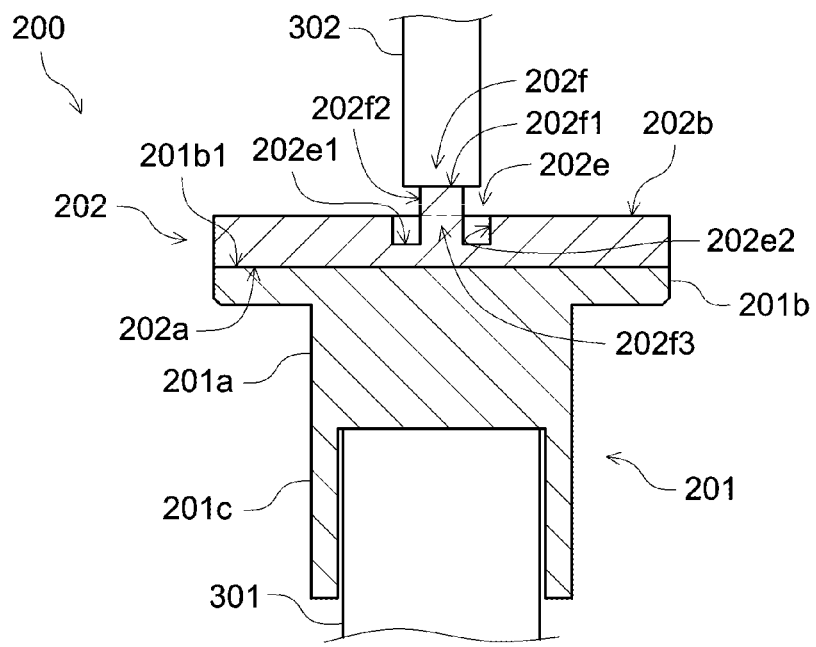
FIG. 5 is a cross-sectional view illustrating a method of manufacturing the terminal component 200.

In the embodiment illustrated by FIGS. 4 and 5, it is shown how the first metal 201 and the second metal 202 are ultrasonically pressure-welded. As shown in FIG. 5, the second metal 202 has a groove 202e on the surface 202b, which later becomes a groove 202c. The groove 202e is formed in a circumferential shape. The groove 202e is continuously provided in the circumferential direction. Here, a bottom portion 202e1 of the groove 202e is parallel to the surface 202b. An outer wall 202e2 of the groove 202e is perpendicular to the surface 202b. The second metal 202 is provided with a protrusion 202f that serves as the inner part 202d. A top portion 202f1 of the protrusion 202f is parallel to the surface 202b. A side wall 202f2 of the protrusion 202f is perpendicular to the surface 202b. The height of the protrusion 202f is larger than the depth of the groove 202e. The protrusion 202f protrudes from the surface 202b.

FIG. 5 is a cross-sectional view illustrating a method of manufacturing the terminal component 200. FIG. 5 shows a state before the first metal 201 and the second metal 202 are ultrasonically pressure-welded. First, the first metal 201 is placed in an anvil 301, The second metal 202 is overlapped on the first metal 201. A horn 302 is attached to the top portion 202f1 of the protrusion 202f of the second metal 202. The second metal 202 is pressurized while applying the vibration required for ultrasonic pressure welding to the horn 302. The pressure and ultrasonic vibration applied to the horn 302 are set, as appropriate, according to the metal type and dimensions of the first metal 201 and the second metal 202. By pressurizing the second metal 202 while applying ultrasonic vibration, the joint portion 203 is formed at the boundary between the first metal 201 and the second metal 202. At that time, a crush mark caused by pressing the horn 302 may be formed at a position on the top portion 201d1 corresponding to the joint portion 203.

When the horn 302 is pressed against the second metal 202, the second metal 202 is plastically deformed. At that time, since the groove 202e is provided, the plastic deformation of the second metal 202 occurs in the groove 202e. In other words, the deformation of the protrusion 202f to which the horn 302 is applied extends only into the groove 202e. As a result, deformation of the terminal component 200 is suppressed. In the embodiment shown in FIG. 4, the deformation occurs mainly in the portion of the inner part 202d near the top portion 202d1 so that the area of the opening 202c4 becomes smaller than the area of the bottom portion 202c3.

The joint portion 203 may be obtained by joining by resistance welding, friction welding, or the like. Similarly, when metal joining is performed by such a method, deformation of the terminal component 200 due to pressurization is suppressed.

The dimensions of the groove 202e and the protrusion 202f may be set such that the groove 202c is not filled after metal joining. The volume of the groove 202e may be set to be larger than the volume of the portion 202f3 of the protrusion 202f protruding from the surface 202b. By setting the volume of the groove 202e in this way, the deformation caused by pressurizing the top portion 202f1 of the protrusion 202f is localized in the groove 202e. As a result, the influence of the deformation of the second metal 202 due to the pressurization on the outer shape of the terminal component 200 can be reduced.

Figure 6:
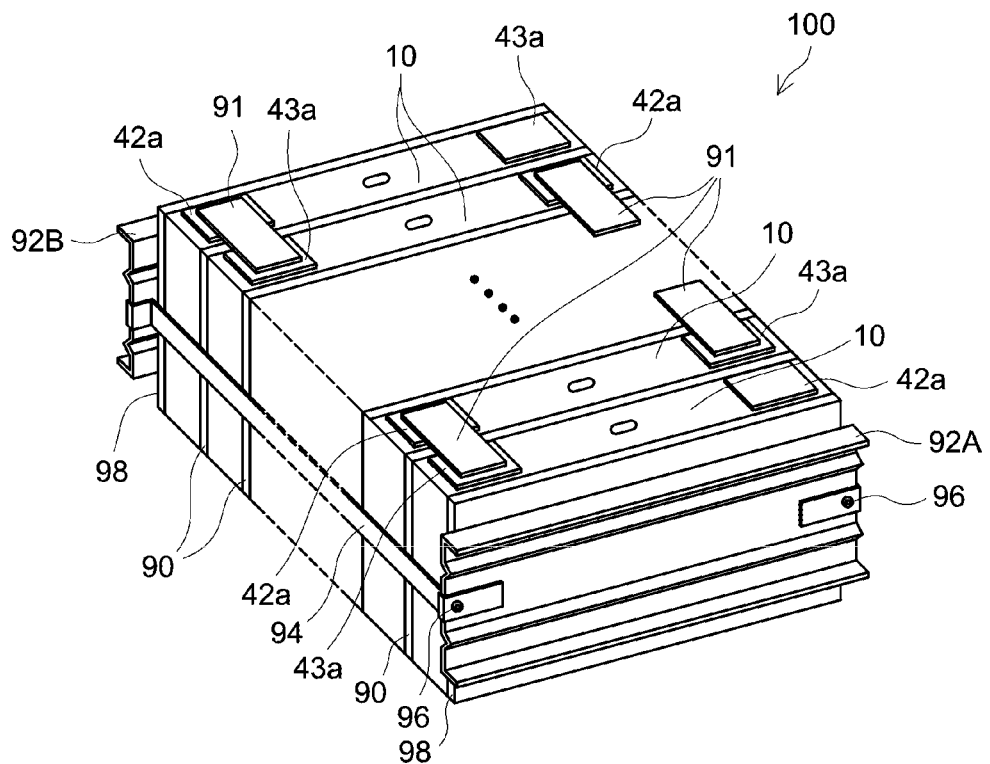
FIG. 6 is a perspective view schematically showing a battery pack 100.

FIG. 6 is a perspective view schematically showing the battery pack 100. The battery pack 100 includes a plurality of secondary batteries 10 and a plurality of spacers 90. Further, the battery pack 100 includes a restraint mechanism. Specifically, as shown in the figure, the battery pack 100 includes a pair of end plates 92A and 92B, a restraint band 94, and a plurality of screws 96. The pair of end plates 92A and 92B are arranged at both ends of the battery pack 100 in the arrangement direction of the secondary batteries 10. The restraint band 94 is bridged over the pair of end plates 92A and 92B, and is attached to the pair of end plates 92A and 92B by screws 96. The spacer 90 is sandwiched between two adjacent secondary batteries 10. Further, one end spacer 98 is arranged between the secondary battery 10 and the end plate 92A and the other is arranged between the secondary battery 10 and the end plate 92B. The positive electrode terminals 42 and the negative electrode terminals 43 of the secondary batteries 10 constituting the battery pack 100 are electrically connected by bus bars 91. As a result, the secondary batteries 10 constituting the battery pack 100 are electrically connected in series in order. However, the shape, size, number, arrangement, connection method, and the like of the secondary batteries 10 constituting the battery pack 100 are not limited to the modes disclosed herein, and can be changed as appropriate.

The terminal component 200 shown in FIG. 4 is used as the external terminal 43b of the negative electrode of the lithium ion secondary battery 10. The external terminal 43b is connected to the bus bar 91. The external terminal 43b and the bus bar 91 can be welded by, for example, laser welding. Aluminum is used for the bus bar 91 from the viewpoint of weight reduction, and in the terminal component 200 proposed herein, aluminum can be used for the first metal 201 of the external terminal 436 of the negative electrode that is exposed to the outside of the lithium ion secondary battery 10. The external terminal 42b of the positive electrode is configured of aluminum. Therefore, dissimilar metal joining does not occur in the joining between the bus bar 91 and the external terminal 43b of the negative electrode or the joining between the bus bar 91 and the external terminal 42b of the positive electrode, and a highly reliable joining in terms of strength can be realized. Further, with the terminal component 200, the part 201c of the external terminal 43b of the negative electrode that is to be joined to the internal terminal 43a (see FIGS. 2 and 3) inside the battery case 41 is the first metal 201 and is configured of copper. Therefore, dissimilar metal joining does not occur in the joining between the external terminal 43b and the internal terminal 43a of the negative electrode, and a highly reliable joining in terms of strength can be realized.

As shown in FIG. 4, the terminal component 200 proposed herein has a groove 202c on the surface 202b of the second metal 202 opposite to the surface 202a overlapping on the first metal 201. The groove 202c is provided on the outside of the joint portion 203. The joint portion 203 is obtained by metal joining by a method such as ultrasonic pressure welding, friction welding, resistance welding, or the like. Since the groove 202c is formed, the deformation of the second metal 202 due to pressure application when foiling the joint portion 203 is unlikely to extend to the outside of the groove 202c. Therefore, the terminal component 200 having good dimensional accuracy is provided. In such a terminal component 200, the possibility of the deformed portion being detached or interfere with other parts is reduced. Further, the bus bar connection surface of the terminal component 200 does not bend, and good connection with the bus bar can be realized.

Here, the groove 202c is continuous in the circumferential direction. When performing metal joining, deformation due to pressurization does not always occur at the same position. Since the groove 202c is continuous around the joint portion 203, the occurrence of deformation of the outer shape of the terminal component 200 can be suppressed more suitably.

In the above-described embodiment, the groove 202c is provided on the outside of the joint portion 203 in which the first metal 201 and the second metal 202 are metal-joined, but this embodiment is not limiting. For example, for the purpose of improving the joining strength between the first metal 201 and the second metal 202, a portion where the first metal 201 and the second metal 202 are metal-joined may be also present on the outside of the groove 202c.

Further, the first metal 201 and the second metal 202 may have a portion joined by a joining other than the metal joining. In order to improve the joining strength or the like, for example, a structure obtained by caulking one metal with the other metal may be provided at the boundary between the first metal 201 and the second metal 202.

A combination of metals constituting the first metal 201 and the second metal 202 is not limited to copper and aluminum, and various metal combinations can be adopted. Further, the first metal 201 and the second metal 202 may be subjected to a treatment such as plating.

Figure 7:
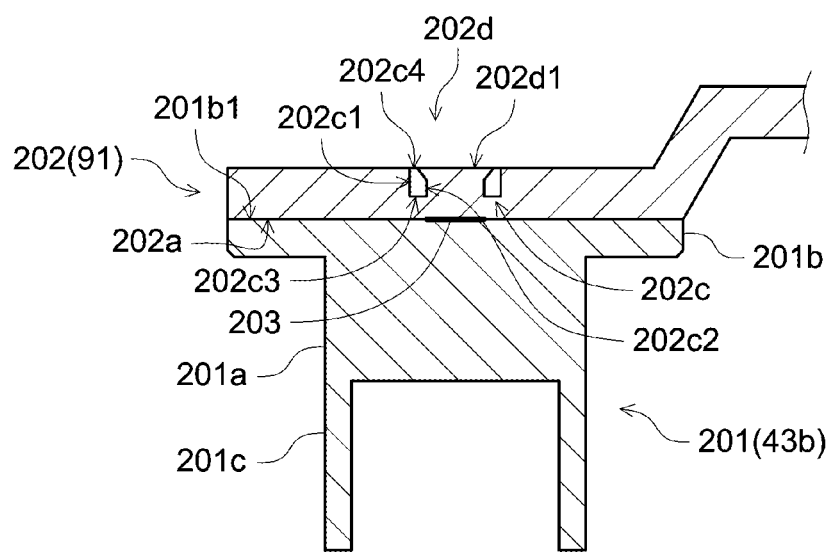
FIG. 7 is a cross-sectional view schematically showing a portion of the battery pack 100 where an external terminal 43b of a negative electrode and a bus bar 91 are connected.

As another aspect of the technique disclosed herein, a battery pack 100 in which the first metal 201 is used as the external terminal and the second metal 202 is used as the bus bar 91 is provided. FIG. 7 is a cross-sectional view schematically showing a portion of the battery pack 100 in which the external terminal 43b of the negative electrode and the bus bar 91 are connected. In the embodiment shown in FIG.

7, the first metal 201 is used as the external terminal 43b of the negative electrode, and the second metal 202 is used as the bus bar 91. Here, the second metal 202 is a long plate-shaped metal member made of aluminum. The surface 202a provided on one end of the second metal 202 is overlapped on the end surface 201b1 of the first metal 201. Although not shown, the other end of the second metal 202 is connected to the external terminal 42b of the positive electrode. At the boundary between the external terminal 43b and the bus bar 91, a joint portion 203 in which the external terminal 43b and the bus bar 91 are joined by metal joining is provided. The bus bar 91 has a groove 202c on the outside of the joint portion 203 on the surface 201b opposite to the joint portion 203.

In the battery pack 100 having such a configuration, the external terminal 43b is configured of one kind of metal. Manufacturing costs are reduced due to the small number of parts. Since the bus bar 91 and the external terminal 43b are metal-joined, the conduction resistance is suppressed to a low level. Further, the bus bar 91 has a groove 202c on the outside of the joint portion 203. As a result, deformation and bending are suppressed on the surface of the bus bar 91 to be joined to the external terminal 43b, and good joining with the external terminal 43b can be realized.

The terminal component, secondary battery, and battery pack disclosed herein have been described in various ways. Unless otherwise specified, the embodiments of the terminal component and battery mentioned herein do not limit the present disclosure. Further, the secondary battery disclosed herein can be variously modified, and constituent elements thereof and processes referred to herein can be omitted, as appropriate, or combined, as appropriate, unless a specific problem occurs.

What is claimed is:

1. A terminal component for a secondary battery, comprising: A terminal component for a secondary battery, comprising: a first metal, and a flat, plate-shaped second metal overlapped on and in contact with the first metal along a first surface on a first side of the second metal, wherein at a boundary between the first metal and the second metal on the first side of the second metal, there is a joint portion in which the first metal and the second metal are joined by metal joining on the first side of the second metal, and the second metal has a groove on an outside of a projection of the joint portion perpendicular to the first surface, and the groove is formed on a second surface of the second metal on a second side of the second metal opposite to the first side of the second metal, and wherein the groove on the second surface of the second metal is defined with a tapered portion having a smaller cross-sectional area in a plane of the second surface with a cross-sectional area of the groove increasing with an increase in a depth of the groove below the second surface.

2. The terminal component according to claim 1, wherein the groove is continuous in a circumferential direction.

3. The terminal component according to claim 1, wherein the first metal and the second metal are composed of dissimilar metals.

4. A terminal component for a secondary battery, comprising:
a first metal, and
a flat, plate-shaped second metal overlapped on and in contact with the first metal along a first surface on a first side of the second metal, wherein
at a boundary between the first metal and the second metal on the first side of the second metal,
there is a joint portion in which the first metal and the second metal are joined by metal joining on the first side of the second metal, and
the second metal has a groove on an outside of a projection of the joint portion perpendicular to the first surface, and the groove is formed on a second surface of the second metal on a second side of the second metal opposite to the first side of the second metal, and
wherein the first metal includes a shaft portion terminating in a flange portion, and the second metal is overlapped on the flange portion of the first metal.

5. A secondary battery comprising:
a battery case and
an electrode terminal attached to the battery case, wherein the electrode terminal includes a terminal component according to claim 4.

6. The terminal component according to claim 4, wherein the joint portion is formed in a central portion of the boundary between the first metal and the second metal.

7. The secondary battery according to claim 5, wherein the terminal component of the electrode terminal is attached to the battery case with an insulating gasket interposed therebetween.

8. A battery pack comprising:
a plurality of secondary batteries having external terminals for positive electrodes and negative electrodes, and
a flat, plate-shaped bus bar that connects the plurality of secondary batteries via the external terminals, wherein
at a boundary along a first surface of the bus bar on a first side of the bus bar in contact with an external terminal of one polarity, among the external terminals, there is a joint portion in which the external terminal of one polarity and the bus bar are joined by metal joining on the first side of the bus bar, and
the bus bar has a groove on an outside of a projection of the joint portion perpendicular to the first surface, and the groove is formed on a second surface of the bus bar on a second side of the bus bar opposite to the first side of the bus bar.

* * * * *